US007845454B2

(12) United States Patent
Takimoto et al.

(10) Patent No.: US 7,845,454 B2
(45) Date of Patent: Dec. 7, 2010

(54) PEDESTRIAN AIRBAG APPARATUS

(75) Inventors: Takayuki Takimoto, Tokyo (JP);
Yoshihiro Kobayashi, Tokyo (JP);
Atsushi Nakamura, Tokyo (JP)

(73) Assignee: Takata Corporation, Tokyo (JP)

( * ) Notice: Subject to any disclaimer, the term of this patent is extended or adjusted under 35 U.S.C. 154(b) by 229 days.

(21) Appl. No.: 12/087,258

(22) PCT Filed: Jan. 9, 2007

(86) PCT No.: PCT/JP2007/050084

§ 371 (c)(1),
(2), (4) Date: Jul. 11, 2008

(87) PCT Pub. No.: WO2007/083537

PCT Pub. Date: Jul. 26, 2007

(65) Prior Publication Data
US 2009/0014988 A1    Jan. 15, 2009

(30) Foreign Application Priority Data
Jan. 17, 2006  (JP)  ............................. 2006-008862
Mar. 20, 2006  (JP)  ............................. 2006-077016

(51) Int. Cl.
*B60R 21/34*  (2006.01)
(52) U.S. Cl. .................. 180/274; 280/730.1; 280/743.2
(58) Field of Classification Search .................. 180/274; 280/730.1, 743.1, 743.2; 296/187.04, 193.11, 296/193.12
See application file for complete search history.

(56) References Cited

U.S. PATENT DOCUMENTS 5,813,696 A * 9/1998  Hill ......................... 280/743.2

6,474,678 B1    11/2002  Boxey
6,955,238 B2 * 10/2005  Takimoto ................... 180/274

(Continued)

FOREIGN PATENT DOCUMENTS

EP    1 350 692 A1    10/2003

(Continued)

OTHER PUBLICATIONS

Machine Translation of JP 2004-299442 (a reference cited by Applicant).*

*Primary Examiner*—Paul N Dickson
*Assistant Examiner*—Joseph Rocca
(74) *Attorney, Agent, or Firm*—Manabu Kanesaka

(57) ABSTRACT

A pedestrian airbag apparatus is provided that has a portion, when inflated, extending along a vehicle body's outer surface so as to spread into the surroundings of a case, and connected to the case by means of a tether, and the occurrence of a deformation such as warpage or the like on an airbag is suppressed, the deformation being due to the tension of the tether. Each of both end sides of a cowl masking portion 5*a* of the airbag 5 is connected to the case 8 by the tether 30. One end of the tether 30 is connected to a mid portion between a facing area R of the cowl masking portion 5*a* facing the case 8 and the utmost tip portion of the cowl masking portion 5*a* on each of both left and right end sides thereof, and the other end of the tether 30 is connected to each of left and right end walls 8*d* of the case 8.

11 Claims, 9 Drawing Sheets

U.S. PATENT DOCUMENTS

2003/0178239 A1* 9/2003 Takimoto .................... 180/274
2006/0151228 A1* 7/2006 Kalliske et al. ............. 180/274

FOREIGN PATENT DOCUMENTS

| JP | 2000-264146 | 9/2000 |
| JP | 2001-171464 | 6/2001 |
| JP | 2002-193065 | 7/2002 |
| JP | 2003-252141 | 9/2003 |
| JP | 2003-252143 | 9/2003 |
| JP | 2003-291756 | 10/2003 |
| JP | 2004-299442 | 10/2004 |
| JP | 2005-349954 | 12/2005 |
| JP | 2006-219046 | 8/2006 |
| WO | WO 2005/023605 A1 | 3/2005 |

* cited by examiner

PEDESTRIAN AIRBAG APPARATUS

TECHNICAL FIELD

The present invention relates to a pedestrian airbag apparatus having an airbag that is inflated to extend along a vehicle body's outer surface, more specifically to a pedestrian airbag apparatus provided with the airbag and a case accommodating the airbag, a portion of which is connected to the case by means of a tether, the portion spreading into the surroundings of the case in its inflated state.

BACKGROUND ART

There is known a pedestrian airbag apparatus that provides an airbag inflated along the vicinity of a cowl of a vehicle body and allows it to receive a pedestrian or the like (pedestrian, bicycle rider, or the like). As a type of this pedestrian airbag apparatus, one is known that an airbag is accommodated in a case and, when inflated, the airbag extends along a vehicle body's outer surface so as to spread into the surroundings of the case.

In Japanese Unexamined Patent Application Publication No. 2004-299442, a pedestrian airbag apparatus is described that portions of an airbag spreading into the surroundings of a case when inflated to extend are connected to the case by means of tethers so as to suppress the fluttering of the portions when inflated to extend.

In the pedestrian airbag apparatus of the above publication, an airbag is a substantially U-shaped member having a cowl louver protection portion that is inflated to extend along a cowl louver of a vehicle body in a vehicle body widthwise direction, and pillar protection portions that are connected to both ends of the cowl louver protection portion and are inflated to extend along left and right A-pillars of the vehicle body, respectively.

The vicinity of the midpoint of the cowl louver protection portion in its extending direction is fixed to the case. The case has a width in the vehicle body widthwise direction smaller than that of the cowl louver protection portion, and, when the airbag is inflated, both end sides of the cowl louver protection portion in its extending direction and the pillar protection portions connected thereto each extend laterally so as to spread out from the case.

In the above publication, the both end sides of the cowl louver protection portion in its extending direction are each connected to the case by means of a tether and, when the airbag is inflated to extend, the fluttering of these portions is suppressed.

[Patent Document 1] Japanese Unexamined Patent Application Publication No. 2004-299442

In the above Japanese Unexamined Patent Application Publication No. 2004-299442, as shown in FIG. 10 of the publication, one end of each of the tethers is connected to the utmost tip portion of each of the both end sides of the cowl louver protection portion in its extending direction. Therefore, when the airbag is inflated to extend, as shown in FIG. 13 of the publication, the utmost tip portions of the both end sides of the cowl louver protection portion in its extending direction (namely, the both side end faces of the cowl louver protection portion in its extending direction in its inflated state) are pulled to the undersurface side of the airbag due to the tension of the respective tethers; therefore, on the both end sides of the cowl louver protection portion in its extending direction, a moment tends to arise that serves so as to wind each of the both end sides toward the undersurface side of the airbag. As a result, there is a risk that a deformation such as warpage, buckling, or the like would occur on the cowl louver protection portion.

SUMMARY OF THE INVENTION

An object of the present invention is to provide a pedestrian airbag apparatus in which the occurrence of a deformation such as warpage or the like due to the tension of a tether is suppressed, the pedestrian airbag apparatus being provided with an airbag having a portion connected to a case by means of the tether, the portion, when inflated, extending along a vehicle body's outer surface so as to spread into the surroundings of the case.

A pedestrian airbag apparatus of the present invention includes an airbag inflated to extend along a vehicle body's outer surface, a case accommodating the airbag, and an inflator for inflating the airbag, which, when inflated, extends out from the case along the vehicle body's outer surface so as to spread into the surroundings of the case, and a portion of which is connected to the case through a tether, the portion spreading into the surroundings of the case in its inflated state; wherein this pedestrian airbag apparatus is characterized in that, in a state when the airbag is inflated, one end of the tether is connected to the airbag at a position on its tip end side in a predetermined direction of spreading from the case relative to a facing area facing the case, and also on its base end side in the predetermined direction of spreading relative to its utmost tip portion in the predetermined direction of spreading, and the other end of the tether is connected to the case.

In a state when the airbag is inflated, the vehicle body's outer surface side and its opposite side of the airbag are joined together by a sewn portion at least at a position on the tip end side of the airbag in the predetermined direction of spreading from the case relative to a facing area facing the case and also on the base end side of the airbag in the predetermined direction of spreading relative to the utmost tip portion in the predetermined direction of spreading, and the one end of the tether may be joined to the vehicle body's outer surface side of the airbag by sewing with a sewn portion common to that described above.

The one end of the tether may be joined by the sewn portion having a circular shape to the vehicle body's outer surface side of the airbag.

The pedestrian airbag apparatus includes a cowl masking portion extending along the rear edge of a bonnet hood of a vehicle body in its widthwise direction, and a pillar masking portion, a lower end of which is connected to the cowl masking portion, extending along an A-pillar of the vehicle body substantially in its up-and-down direction; wherein a linking member for linking the cowl masking portion and the pillar masking portion may be provided in a corner portion where these portions intersect each other.

The pedestrian airbag apparatus includes a cowl masking portion extending along the rear edge of a bonnet hood of a vehicle body in its widthwise direction, and a pillar masking portion, a lower end of which is connected to the cowl masking portion, extending along an A-pillar of the vehicle body substantially in its up-and-down direction; wherein a first tether and a second tether are provided as the tether, in a state when the cowl masking portion is inflated, one end of the first tether is connected to the cowl masking portion at a position on its tip end side in a predetermined direction of spreading from the case relative to a facing area facing the case, and also on its base end side in the predetermined direction of spreading relative to its utmost tip portion in the predetermined direction of spreading, the other end of the tether is connected to the case, the upper end of the second tether is connected to a mid portion of the pillar masking portion in its up-and-down direction, and the lower end of the second tether is connected to the case.

A linking member for linking the cowl masking portion and the pillar masking portion may be provided in a corner portion where these portions intersect each other.

DETAILED DESCRIPTION

Figure 1:
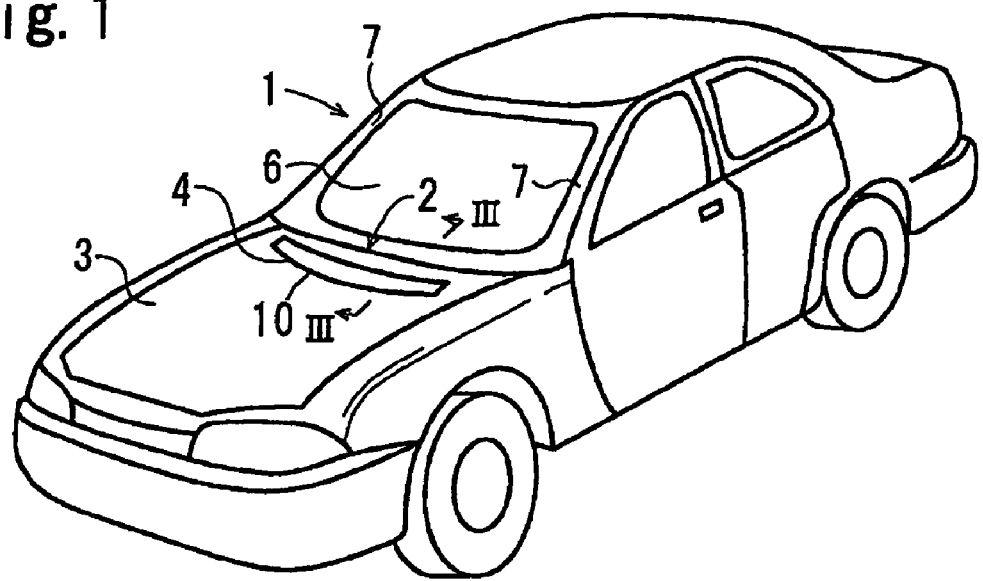
FIG. 1 is a perspective view of a vehicle provided with a pedestrian airbag apparatus according to an embodiment of the present invention.

In a pedestrian airbag apparatus of the present invention, since a portion of an airbag is connected to a case by means of a tether, the portion when inflated extending along a vehicle body's outer surface so as to spread into the surroundings of the case, when the airbag is inflated to extend, the fluttering of the portion is suppressed.

In the present invention, in a state when the airbag is inflated, the tether is connected to the airbag at a position on its tip end side in a predetermined direction of spreading from the case relative to a facing area facing the case, and also on its base end side in the predetermined direction of spreading relative to its utmost tip portion in the predetermined direction of spreading, i.e., is connected to the airbag at a mid-position between its utmost tip portion in the predetermined direction of spreading and the facing area facing the case.

Accordingly, when the airbag is inflated to extend, it hardly occurs that the utmost tip portion of the airbag in the predetermined direction of spreading (namely, a side end face of the airbag in the predetermined direction of spreading in its inflated state) is pulled to the undersurface side of the airbag due to the tension of the tether, and a moment that serves so as to wind the tip portion side toward the undersurface side of the airbag hardly arises on the tip side of the airbag in the predetermined direction of spreading. Because of this, the occurrence of a deformation such as warpage, buckling, or the like on the airbag is prevented or suppressed.

It should be noted that, in the case of such an airbag extending in a vehicle body widthwise direction and when the both sides of the airbag in the vehicle body widthwise direction are each inflated to extend laterally so as to spread out from the case, as with, for example, the above Japanese Unexamined Patent Application Publication No. 2004-299442, "in a state when the airbag is inflated, a position on the tip end side of the airbag in a predetermined direction of spreading from the case relative to a facing area facing the case, and also on the base end side of the airbag in the predetermined direction of spreading relative to the utmost tip portion in the predetermined direction of spreading" described above means a mid-position between the utmost tip portion of the airbag on one end side in the vehicle body widthwise direction and the end portion of the case on one end side in the vehicle body widthwise direction, and the other mid-position between the utmost tip portion of the airbag on the other end side in the vehicle body widthwise direction and the end portion of the case on the other end side in the vehicle body widthwise direction.

In the case that the vehicle body's outer surface side and its opposite side of the airbag are joined together by sewing with a sewn portion at least in a mid-position between the utmost tip portion in the predetermined direction of spreading and a facing area facing the case in order to partition the airbag into a plurality of chambers, or to prevent or suppress the airbag thickness from becoming excessively large, one end of the tether may be attached to the airbag by sewing with a sewn portion common to that described above, as with Claim 2.

With this configuration, the sewing of the airbag and the attaching of the tether can be done at one time, which can make the sewing work of the airbag easy.

In this case, the strength of connecting the tether to the airbag is increased by attaching the tether to the airbag by sewing with a circular sewn portion.

In an embodiment of the present invention, an airbag includes a cowl masking portion extending along the rear edge of a bonnet hood of a vehicle body in its widthwise direction and a pillar masking portion extending along an A-pillar upward from the cowl masking portion, and is provided with a linking member for linking the pillar masking portion to the cowl masking portion at a corner of the intersecting portion thereof. The linking member suppresses the fluttering of the pillar masking portion when the airbag is inflated.

In another embodiment of the present invention, an airbag includes a cowl masking portion extending along the rear edge of a bonnet hood of a vehicle body in its widthwise direction and a pillar masking portion extending along an A-pillar upward from the cowl masking portion, and is provided with a first tether connecting the cowl masking portion and a case, and a second tether connecting the pillar masking portion and the case. When the airbag is inflated, the fluttering of the cowl masking portion is suppressed by the first tether, while the fluttering of the pillar masking portion is suppressed by the second tether.

It should be noted that, in this embodiment, since the top end of the second tether is connected not to the utmost tip portion of the pillar masking portion on its upper end side but to a mid portion thereof in an up-and-down direction, when the airbag is inflated, it hardly occurs that the utmost tip portion of the pillar masking portion on its upper end side is pulled to the undersurface side of the airbag due to the tension of the second tether, and on the top end side of the pillar masking portion a moment hardly arises that serves so as to wind its upper end side toward the undersurface side of the airbag. Because of this, the occurrence of a deformation such as warpage, buckling, twisting, or the like on the pillar masking portion is also suppressed.

Further in this case, in addition to the second tether, a linking member for linking the pillar masking portion and the cowl masking portion may be provided at a corner of the intersecting portion thereof. With this configuration, the fluttering of the pillar masking portion when the airbag is inflated can be further suppressed.

Figure 2:
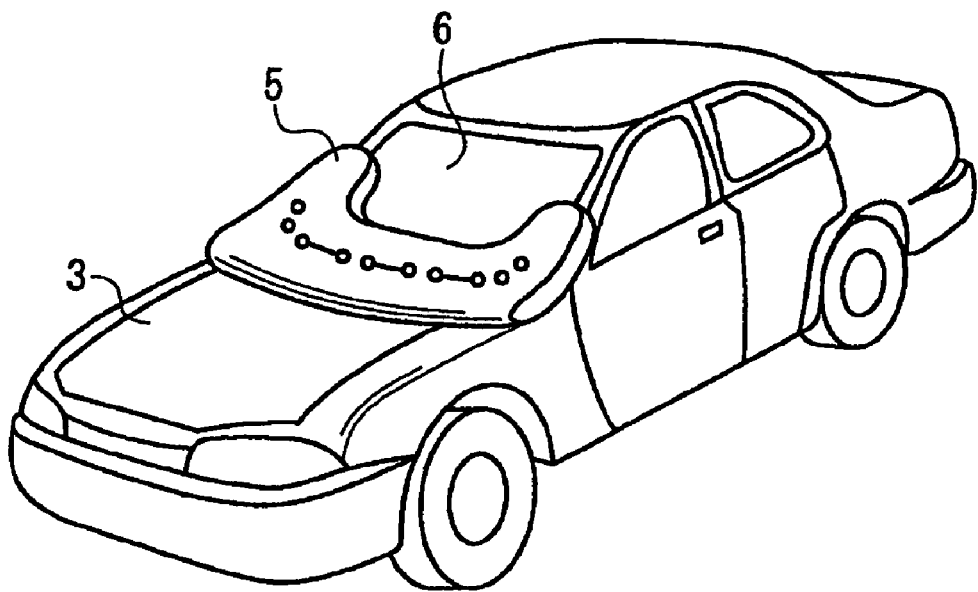
FIG. 2 is a perspective view of the vehicle of FIG. 1 when its airbag is inflated.
Figure 3:
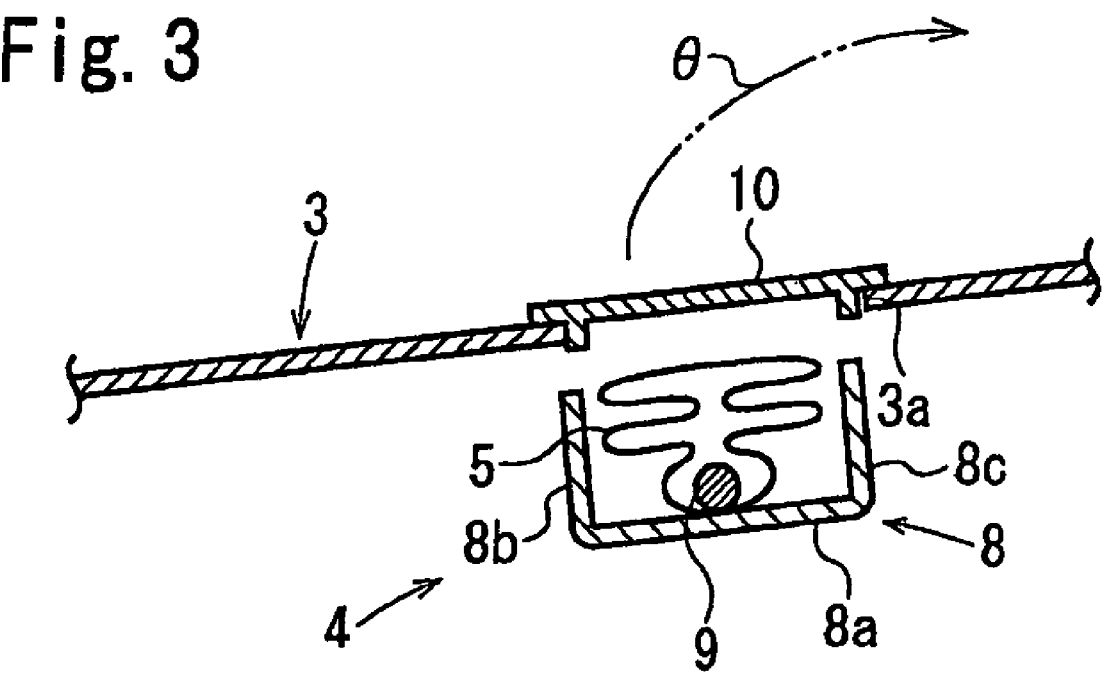
FIG. 3 is a cross-section view taken along lines III-III of FIG. 1.
Figure 4:
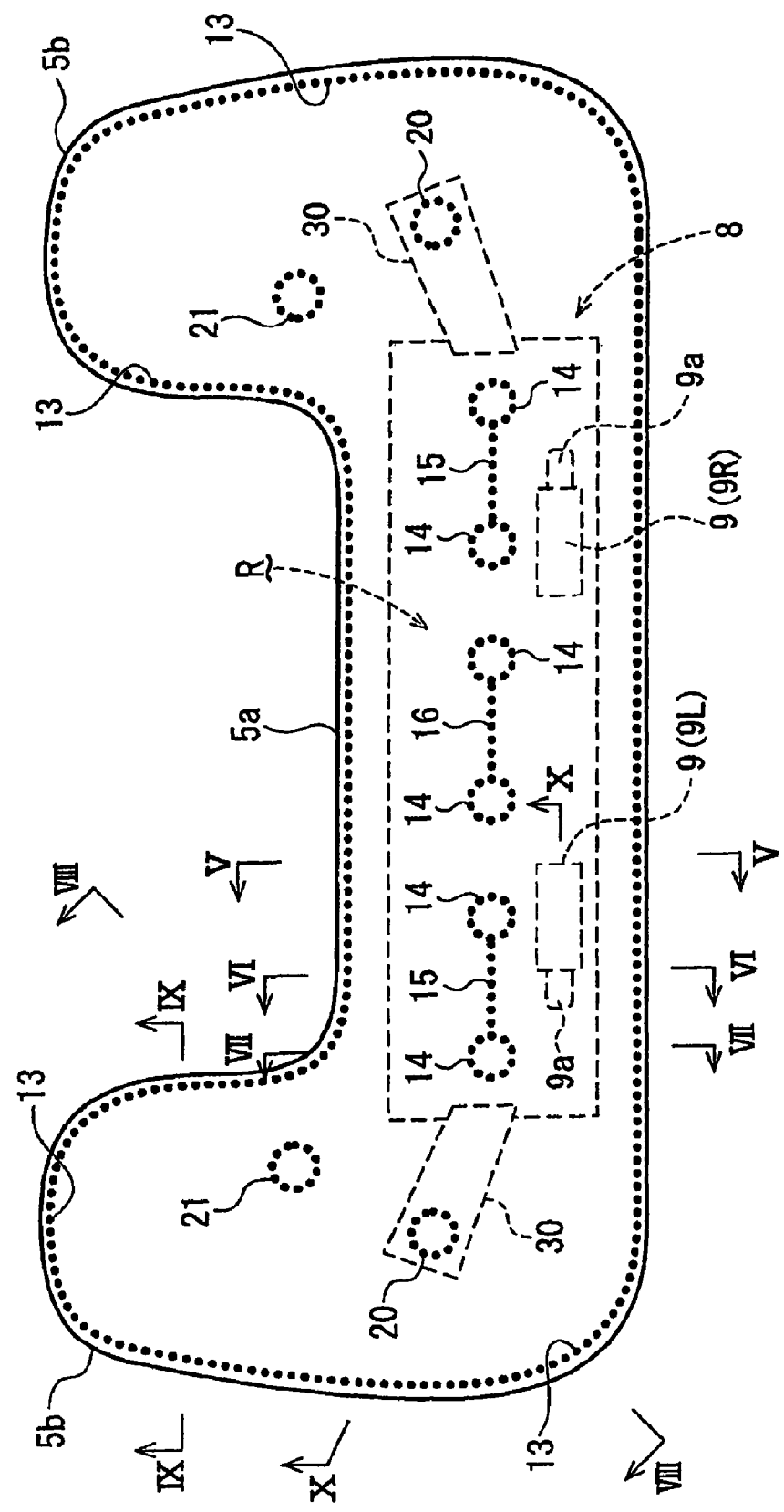
FIG. 4 is a plan view of the inflated airbag.

An embodiment of the present invention will now be described with reference to the attached drawings. FIG. 1 is a perspective view of a vehicle provided with a pedestrian airbag apparatus according to an embodiment of the present invention, FIG. 2 is a perspective view of the vehicle of FIG. 1 when its airbag is inflated, FIG. 3 is a cross-section view taken along lines III-III of FIG. 1, FIG. 4 is a plan view of the inflated airbag, and FIG. 5 through FIG. 10 are cross-section views taken along lines V-V through X-X of FIG. 4. Note that the "left and right direction" in the following description means a vehicle body widthwise direction.

Although the automobile 1 shown in FIG. 1 is a four-door sedan, the present invention is not limited to any particular type of vehicle. A pedestrian airbag apparatus 4 is installed in a rear portion of a bonnet hood 3. As shown in FIG. 2, when an airbag 5 of the pedestrian airbag apparatus 4 is inflated, a cowl louver 2, a window shield 6 and at least a part of left and right A-pillars 7 are covered by the airbag 5.

As shown in FIG. 3, the pedestrian airbag apparatus 4 includes a case 8 for accommodating the folded airbag 5, a pair of inflators 9 (9L, 9R) for inflating the airbag 5, a lid 10 closing an airbag pass-through opening 3a of a hood 3, a pair of tethers 30 for connecting portions of the airbag 5 (both left and right end sides of a cowl masking portion 5a, described later) to the case 8, the portions extending along an vehicle body's outer surface so as to spread into the surroundings of the case 8 when inflated, and the like.

The case 8 is a long box-like member extending in a vehicle body widthwise direction. This case 8 has a bottom portion 8a, a front wall portion 8b, a rear wall portion 8c, and left and right end walls 8d, while having no ceiling.

In this embodiment, a folded body of the airbag 5 extends in the case 8 from its right end side to its left end side. Furthermore, the inflators 9 are each disposed inside the airbag 5.

Each of the inflators 9 (or inflator holder (not shown) mounted to each of the inflators 9) is provided with a pair of stud bolts 9c so as to project therefrom. The stud bolts 9c are inserted through bolt insertion holes (not denoted by a reference numeral), which are provided in the undersurface of the airbag 5 (lower panel 12, described later), to extend outward from the airbag. Each of the stud bolts 9c is inserted through a bolt insertion hole (not denoted by a reference numeral) provided in a bottom face 8a of the case 8 and is tightened with a nut 9d from the backside thereof; thereby each of the inflators 9 and the undersurface of the airbag 5 are secured to the bottom face 8a.

The lid 10 is retained at its vehicle body rear edge side to the vehicle body by means of a hinge (not shown) at the rear edge side of the opening 3a of the hood 3, and is configured so as to, when the airbag 5 is inflated, open backward as shown by the arrow θ in FIG. 3 while being pivoted. The front edge side of the lid 10 is retained to the vehicle body by means of a retaining means (not shown) such as, for example, a clip, at the front edge side of the opening 3a. This retaining means is configured so as to be disengaged when the lid 10 is opened by being pushed by the airbag 5.

The construction of the airbag 5 will be described below with reference to FIG. 4 through FIG. 10.

This airbag 5 is a bag-like member fabricated in a manner such that an upper panel 11 and a lower panel 12 are superposed and the circumferential portions thereof are joined together. In this embodiment, an elastic adhesive S is applied to an airbag inside surface of circumferential portions of the upper panel 11 and lower panel 12, and the circumferential portions of the upper panel 11 and lower panel 12 are bonded together with the elastic adhesive S as well as being sewn together by a circumferential sewn portion (sewing string) 13. The gap between the panels 11, 12 is sealed by the elastic adhesive S, and in the case when the airbag 5 is inflated, gas leakage from the gap between the panels 11, 12 is prevented.

What is desirable as the elastic adhesive S is such that the percentage of elongation is of the order of 200%. It is noted that although a variety of adhesives such as a silicon type adhesive, an urethane type adhesive, or the like can be used as the elastic adhesive S, it is desirable to use, for example, a silicon type adhesive as the elastic adhesive S in the case when a coating of silicon type material has been applied to the airbag inside surface of the panels 11, 12, or an urethane type adhesive as the elastic adhesive S in the case when a coating of urethane type material has been applied.

The elastic adhesive S is preferably applied at an amount of the order of 0.01 to 0.05 g/cm² across a width of 5 to 15 mm along the circumferential portion of the panels 11, 12.

It is noted that although this airbag 5 is a substantially U-shaped member having a cowl masking portion 5a, which covers the cowl 2 and a lower portion of the window shield 6, and pillar masking portions 5b, 5b, which extend along the left and right A-pillars and cover at least the lower edge sides of the A-pillars, respectively, the pillar masking portions 5b, 5b being connected to both left and right end sides of the cowl masking portion 5a, the extended shape of the airbag is not limited to this. The airbag 5 may be, for example, a substantially rectangular-shaped member covering substantially a whole of the cowl, window shield and A-pillars, or alternatively a substantially H-shaped member having a pair of fender masking portions, which extend frontward from both left and right end sides of a cowl masking portion 5a so as to cover left and right fender portions, respectively.

In the cowl masking portion 5a, the upper panel 11 and lower panel 12 of the airbag 5 are joined together by circular sewn portions 14 and linear sewn portions 15, 16, in the vicinity of the central portion of the panels 11, 12. The linear sewn portions 15, 16, 15 extend across the center of the cowl masking portion 5a in a vehicle body widthwise direction. These linear sewn portions 15, 16, 15 are disposed substantially linearly with respect to each other. Incidentally, the sewn portion 16 is disposed to extend in the vicinity of the midpoint of the cowl masking portion 5a in its extending direction, and the sewn portions 15, 15 are disposed to extend on the left and right sides of the sewn portion 16, respectively. These sewn portions 15, 16, 15 are spaced each other.

With this configuration, the inside of the cowl masking portion 5a of the airbag 5 is partitioned into a chamber 17 on the front side of the vehicle body and a chamber 18 on the rear side of the vehicle body with respect to the linear sewn portions 15, 16, 15.

In each end portion of each of the linear sewn portions 15, 16, 15, the circular sewn portion 14 is disposed. The panels 11, 12 are not joined together in areas between each of the left and right linear sewn portions 15 and the middle linear sewn portion 16; thereby through portions 19 connecting the chambers 17, 18 to each other are constituted.

In this embodiment, for the purpose of suppressing the thickness of the airbag 5 in its inflated state, the panels 11, 12 are joined together by circular sewn portions 20, 21, which are isolated from the linear sewn portions 15. As shown in FIG. 4, each of the circular sewn portions 20 is disposed at a position closer to each of the left and right end sides of the cowl masking portion 5a relative to the linear sewn portion 15, and each of the circular sewn portions 21 is disposed on the side of the pillar masking portion 5b with a space from the circular sewn portion 20.

It is noted that although not shown, in the portions described above where the panels 11, 12 are joined together by each of the linear sewn portions 15, 16 and circular sewn portions 14, 20, 21, the elastic adhesive S may be applied to an airbag inside surface of the panels 11, 12, and the panel 11, 12 may be bonded together with the elastic adhesive S as well as being sewn together by each of the sewn portions 14, 15, 16, 20, 21, as with the portion where the circumferential portions of the panels 11, 12 are joined together.

In this airbag 5, as shown in FIG. 4, the width of the cowl masking portion 5a in a vehicle body widthwise direction (left and right direction) in its inflated state is larger than that of the case 8 in the vehicle body widthwise direction. The undersurface of the cowl masking portion 5a (lower panel 12) on a central side in its extending direction is secured to the bottom surface 8a of the case 8 by each of the inflators 9 as described above, and, when the airbag 5 is inflated, the both left and right end sides of the cowl masking portion 5a (and the respective pillar masking portions 5b) each extend laterally so as to spread out from the case.

Figure 8:
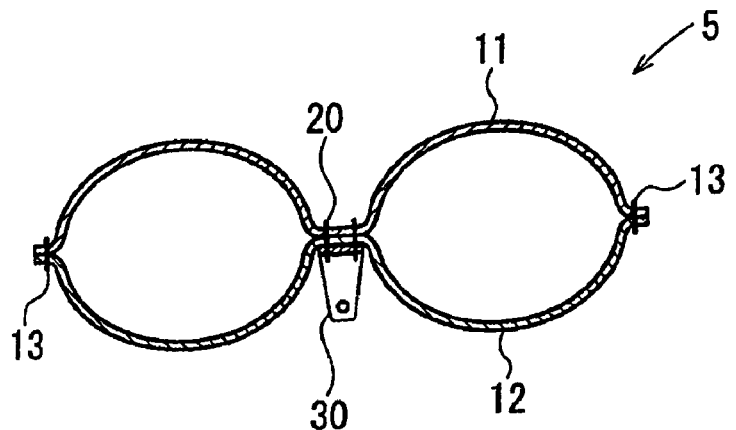
FIG. 8 is a cross-section view taken along lines VIII-VIII of FIG. 4.
Figure 9:
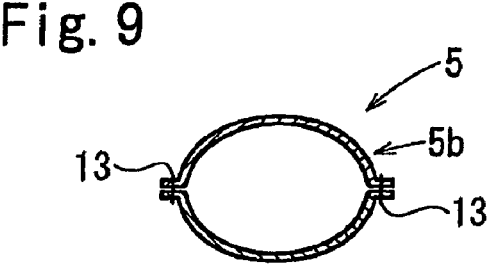
FIG. 9 is a cross-section view taken along lines IX-IX of FIG. 4.
Figure 10:
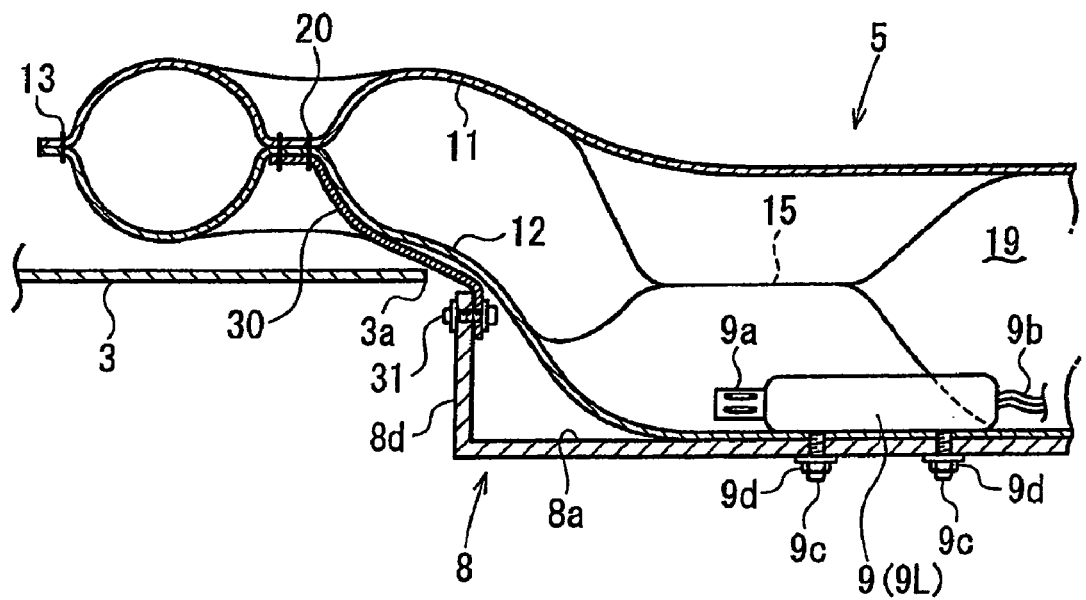
FIG. 10 is a cross-section view taken along lines X-X of FIG. 4.

The tethers 30 described above connect portions of the cowl masking portion 5a on its both left and right end sides to the case 8, respectively, the portions spreading out laterally from the case when inflated. In this embodiment, as shown in FIG. 8 and FIG. 10, one end side of each of the tethers 30 is attached to the undersurface of the lower panel 12 by sewing with the circular sewn portion 20.

As shown in the attached drawings, each of the circular sewn portions 20, i.e., the portion where one end side of each of the tethers 30 is joined to the lower panel 12 is located, in a state when the cowl masking portion 5a is inflated, at a position of the cowl masking portion 5a on each of its left and right end sides relative to a facing area R facing the case 8 (the area enclosed by a dotted line indicating the case 8 in FIG. 4), and also on the midpoint side in an extending direction of the cowl masking portion 5a relative to the utmost tip portion (circumferential sewn portion 13) of the cowl masking portion 5a on each of its left and right end sides, that is, a mid-position between the left end of the facing area R (left end wall 8d of the case 8) and the circumferential sewn portion 13 of the cowl masking portion 5a on its left end side, and another mid-position between the right end of the facing area R (right end wall 8d of the case 8) and the circumferential sewn portion 13 of the cowl masking portion 5a on its right end side.

It should be noted that, in the present invention, this "mid-position" means a position such that, in a state when the airbag is inflated, if the distance from the left end wall 8d to the circumferential sewn portion 13 of the cowl masking portion 5a on its left end side and the distance from the right end wall 8d to the circumferential sewn portion 13 of the cowl masking portion 5a on its right end side are each assumed to be 100%, the distance from the left end wall 8d to the portion (left side circular sewn portion 20) where the left side tether 30 and the lower panel 12 are joined together and the distance from the right end wall 8d to the portion (right side circular sewn portion 20) where the right side tether 30 and the lower panel 12 are joined together are each to be 10 to 80%, specifically to be 20 to 60%.

It is further noted that, in this embodiment, when one end side of each of the tethers 30 is to be connected to the airbag 5, the upper panel 11, lower panel 12 and one end of the tether 30 are superposed at a planned position for forming the circular sewn portion 20 and are then sewn together into one body. When the tether is thus to be attached, an elastic adhesive S may be also applied to a facing surface on one side of the tether 30 facing the lower panel 12 and the one side of the tether 30 may be bonded to the lower panel 12 with the elastic adhesive S, while being sewn by the circular sewn portion 20.

The other end side of each of the tethers 30 is fixed to the end wall 8d of the case 8 on its left and right sides by means of a fixing member 31 such as a bolt or the like, as shown in FIG. 10.

Figure 5:
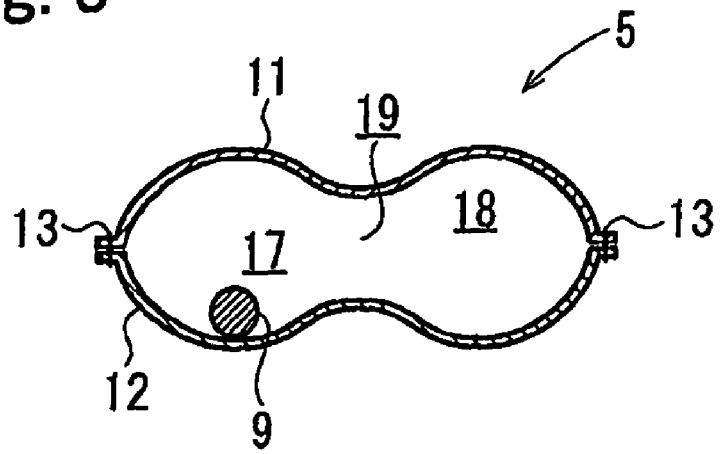
FIG. 5 is a cross-section view taken along lines V-V of FIG. 4.
Figure 6:
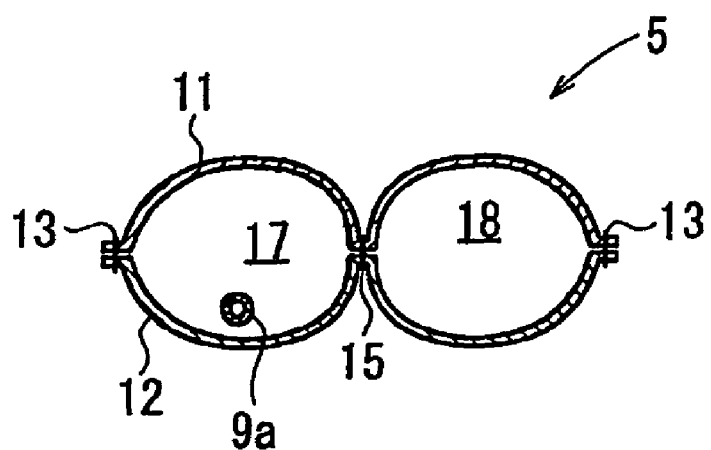
FIG. 6 is a cross-section view taken along lines VI-VI of FIG. 4.
Figure 7:
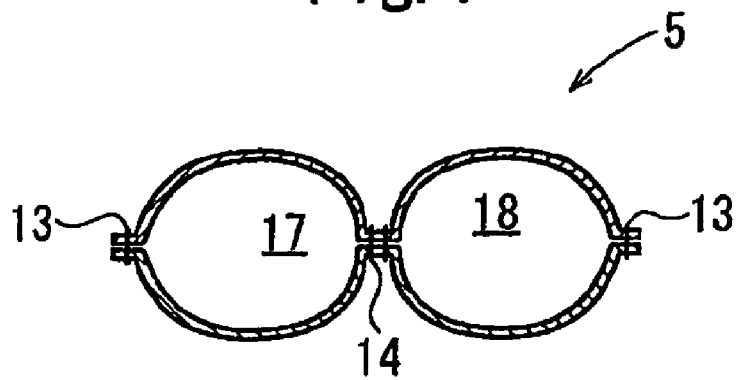
FIG. 7 is a cross-section view taken along lines VII-VII of FIG. 4.

It is noted that, as shown in FIGS. 4 through 6, the respective inflators 9 (9L, 9R) are disposed in the chamber 17. As shown in FIG. 4, the inflator 9L on one side is disposed to adjoin the linear sewn portion 15 on the left side relative to the linear sewn portion 16 in the middle of the cowl masking portion 5a, and the inflator 9R on the other side is disposed to adjoin the linear sewn portion 15 on the right side.

In this embodiment, each of the inflators 9L, 9R has a cylindrical shape and is configured so as to blow out gas toward an emission direction from a gas blow-out portion 9a on its one end side.

The gas blow-out portion 9a of each of the inflators 9L, 9R is confronted with a mid portion of the adjacent linear sewn portion 15 in its longitudinal direction. That is, the gas blow-out portion 9a is located on the front side of the vehicle body relative to the mid portion of the linear sewn portion 15 in its longitudinal direction.

A harness 9b for passing a current to an initiator (not shown) of each of the inflators 9L, 9R is connected to an inflator control circuit (not shown). Based on an activation signal from this inflator control circuit, the initiator of each of the inflators 9L, 9R is activated to allow each of the inflators 9L, 9R to blow out gas.

Although not shown, the automobile 1 equipped with this pedestrian airbag apparatus 4 is provided with various types of sensors, which detect that the automobile 1 has been involved in a collision with a pedestrian or the like, or predict that this automobile will be involved in a collision with a pedestrian or the like. Incidentally, both of the detecting sensor and predicting sensor may be provided. The inflator control circuit described above activates the initiator of each of the inflators 9L, 9R based on a detection signal or a prediction signal from these sensors.

How the pedestrian airbag apparatus 4 thus configured is activated will be described below.

In the case when it is detected by the sensors that the automobile 1 has been involved in a collision with a pedestrian or the like, or predicted by the sensors that the automobile 1 will be involved in a collision with a pedestrian or the like, an activation signal is input from the inflator control circuit to the initiator of each of the inflators 9L, 9R based on the detection signal or the prediction signal, and thereby the initiator is activated, which allows each of the inflators 9L, 9R to blow out gas. Then, the airbag 5 is inflated by the gas from each of the inflators 9L, 9R, and thereby pushes open the lid 10 to extend along a vehicle body's outer surface as shown in FIG. 2.

In this pedestrian airbag apparatus 4, since the both left and right end sides of the cowl masking portion 5a of the airbag 5 are connected to the case 8 by means of the tethers 30, respectively, the cowl masking portion 5a when inflated extending laterally along an vehicle body's outer surface so as to spread out from the case, when the airbag 5 is inflated to extend, the fluttering of the both left and right end sides of the cowl masking portion 5a and the respective pillar masking portions 5b is suppressed.

As described above, since the portion where each of the tethers 30 is joined to the cowl masking portion 5a is located at a position of the cowl masking portion 5a on each of its left and right end sides relative to a facing area R facing the case 8, and also on the midpoint side in its extending direction relative to the utmost tip portion on each of its left and right end sides, when the airbag 5 is inflated to extend, it hardly occurs that the utmost tip portion of the cowl masking portion 5a on each of its left and right end sides (namely, each of the left and right side end faces of the cowl masking portion 5a in its inflated state) is pulled to the undersurface side of the airbag due to the tension of the tether 30, and a moment that serves so as to wind each of the left and right end sides of the cowl masking portion 5a toward the undersurface side of the airbag hardly arises on each of the left and right end sides of the cowl masking portion 5a. Because of this, the occurrence of a deformation such as warpage, buckling, twisting, or the like on the cowl masking portion 5a is also suppressed.

In this embodiment, one end side of each of the tethers 30 is sewn to the lower panel 12 by the sewn portion 20, which joins the upper panel 11 and lower panel 12 of the airbag 5 together, so the sewing of the airbag 5 and the attaching of each of the tethers 30 can be performed at one time; the sewing work for forming the airbag 5 can therefore be easily performed.

Moreover, in this embodiment, since the one end side of each of the tethers 30 is sewn to the lower panel 12 by the circular sewn portion 20, the strength of joining each of the tethers 30 to the lower panel 12 becomes increased.

It is noted that, in this embodiment, the thickness of the airbag 5 in its inflated state is suppressed by joining the upper panel 11 and lower panel 12 of the airbag 5 together by means of the circular sewn portions 14, 20, 21 and the linear sewn portions 15, 16, while the chambers 17, 18 are formed by the linear sewn portions 15, 16. Therefore, the construction of the airbag 5 is simple.

Additionally, in this embodiment, since the gas blow-out portion 9a of each of the inflators 9L, 9R is confronted with a mid portion of the linear sewn portion 15, the force due to pressure of the gas blown out from each of the inflators 9L, 9R, which is applied to the panels 11, 12 so as to alienate the panels 11, 12 from each other, becomes increased at the mid portion of the linear sewn portion 15 and is suppressed from concentrating onto the both end sides of the linear sewn portion 15. As a result, a joint between the panels 11, 12 at the ends of the linear sewn portion 15 can be maintained. The same goes for the ends of the linear sewn portion 16.

Moreover, since there is provided the circular sewn portion 14 at each end portion of the linear sewn portions 15, 16, an extremely strong joint between the panels 11, 12 can be obtained.

The embodiment described above indicates an example of the present invention, and the present invention is not limited to the above embodiment.

Figure 11:
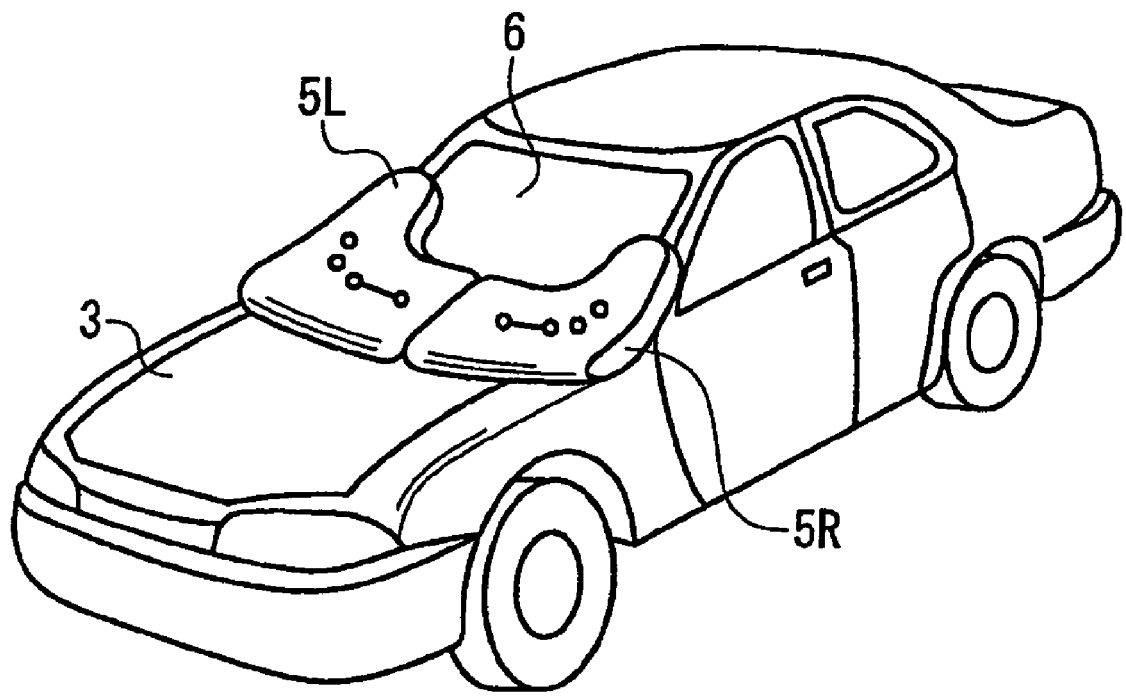
FIG. 11 is a perspective view of a vehicle provided with a pedestrian airbag apparatus according to another embodiment of the present invention.

For example, although the configuration in the embodiment described above is such that the one airbag 5 covers an area surrounding the cowl 2 of the vehicle body and the left and right A-pillars 7, 7 from the left side to the right side of the vehicle body, it may be configured in a manner such that a plurality of airbags cover these portions. For example, in an embodiment of FIG. 11, there are provided a pair of airbags 5L, 5R, which are configured so as to cover the left half side of the cowl 2 (and its surrounding area) and the left side A-pillar 7 by the airbag 5L on one side, and to cover the right half side of the cowl 2 (and its surrounding area) and the right side A-pillar 7 by the airbag 5R on the other side.

As a matter of course, three or more airbags may be provided. An airbag may also be provided that covers areas other than the area surrounding the cowl 2 and the left and right A-pillars 7, 7, as described above.

Although, in the embodiment described above, one end side of each of the tethers 30 is sewn by the circular sewn portion 20, which sews the upper panel 11 and lower panel 12 of the air bag 5 together, each of the tethers 30 may be attached to a portion other than the circular sewn portion 20. Likewise, the tether 30 may be attached by means of a sewn portion that is not common to the sewn portion for joining the panels 11, 12 together.

Each of one end side and the other end side of the cowl masking portion 5a, although being connected to the case 8 by one tether in the embodiment described above, may be connected to the case 8 by two or more tethers.

Figure 12:
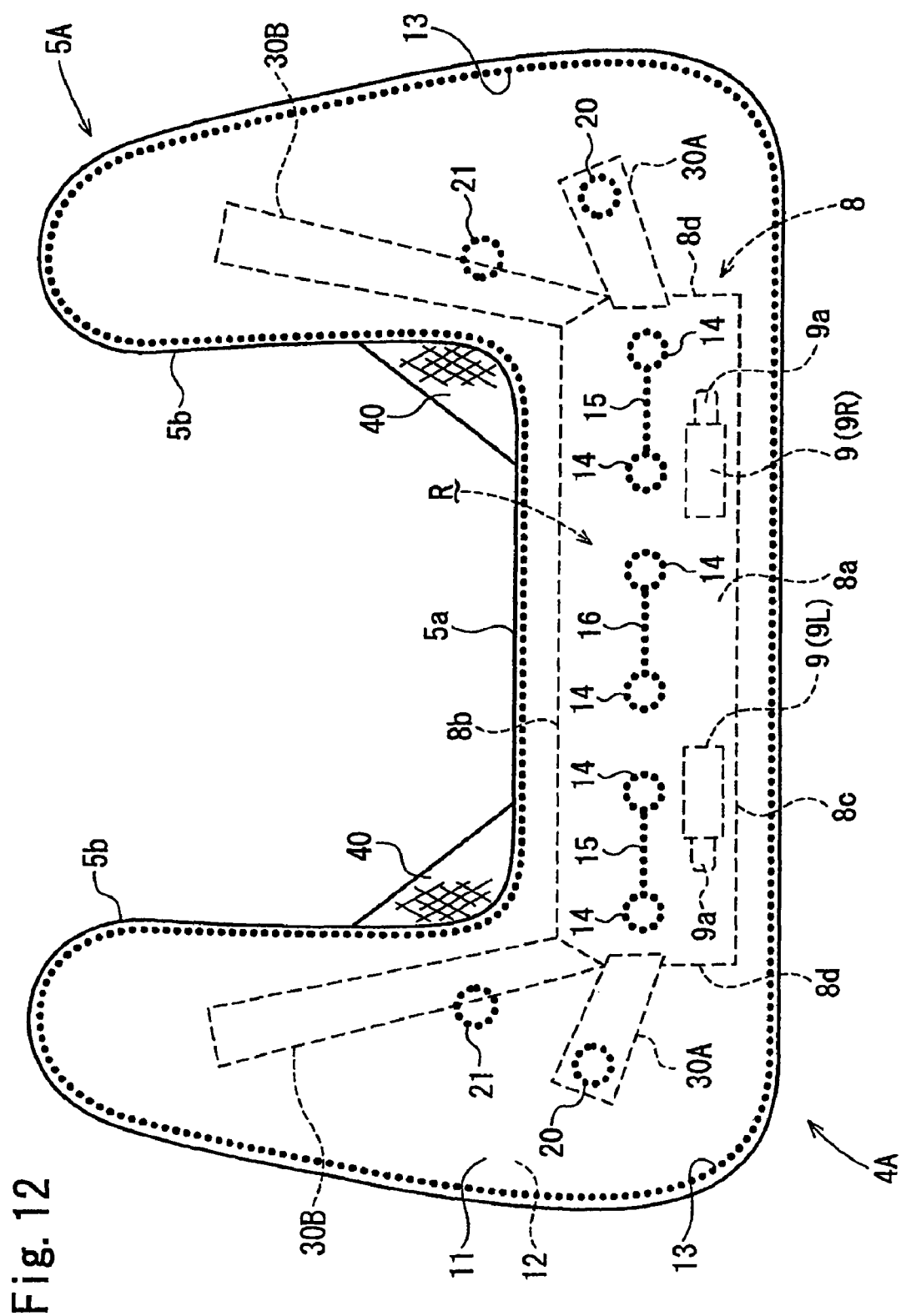
FIG. 12 is a plan view of a pedestrian airbag apparatus, when its airbag is inflated, according to another embodiment of the present invention.

FIG. 12 is a plan view of a pedestrian airbag apparatus, when its airbag is inflated, according to another embodiment of the present invention.

Also in a pedestrian airbag apparatus 4A of this embodiment, an airbag 5A is a substantially U-shaped member having a cowl masking portion 5a, which is inflated to extend along the rear edge of a bonnet hood 3 in a vehicle body widthwise direction (left and right direction) so as to cover a cowl 2 and a lower portion of a window shield 6 of a vehicle body, and pillar masking portions 5b, 5b, the lower edges of which are connected to the left and right end portions of the cowl masking portion 5a, respectively, each of the pillar masking portions 5b, 5b being inflated to extend upwardly along a A-pillar 7 of the vehicle body. (Note that the vehicle body (cowl 2, window shield 6, bonnet hood 3, A-pillars 7, and the like) is not shown in FIG. 12. See FIGS. 1 and 2.)

In this embodiment, each of the pillar masking portions 5b has an up-and-down length coverable over the vicinity of the top end of the A-pillar 7 when inflated.

As shown, also in this airbag 5A, the width of the cowl masking portion 5a in a vehicle body widthwise direction (left and right direction) in its inflated state is larger than that of the case 8 in the vehicle body widthwise direction. The undersurface of the cowl masking portion 5a (lower panel 12) on the central side in its extending direction is secured to the bottom face 8a of the case 8 by each of the inflators 9, and, when the airbag 5 is inflated, the both left and right end sides of the cowl masking portion 5a and the respective pillar masking portions 5b respectively connected thereto each extend laterally so as to spread out from the case.

In this embodiment, as tethers, there are provided first tethers 30A for connecting both left and right end sides of the cowl masking portion 5a to the case 8 and second tethers 30B for connecting the respective pillar masking portions 5b to the case 8.

The first tethers 30A are ones similar to the tethers 30 in the above embodiment of FIGS. 1 through 10.

That is, in a state when the cowl masking portion 5a is inflated, one end side of each of the tether 30A is sewn at a position of the cowl masking portion 5a on each of its left and right end sides relative to a facing area R facing the case 8 (the area enclosed by a dotted line indicating the case 8 in FIG. 12) and also on the midpoint side in its extending direction relative to the utmost tip portion (circumferential sewn portion 13) of the cowl masking portion 5a on each of its left and right end sides, namely, a mid-position between the left end of the facing area R (left end wall 8*d* of the case 8) and the circumferential sewn portion 13 of the cowl masking portion 5*a* on its left end side, and another mid-position between the right end of the facing area R (right end wall 8*d* of the case 8) and the circumferential sewn portion 13 of the cowl masking portion 5*a* on its right end side.

And, the other end side of each of the tethers 30A is sewn to each of the left and right end walls 8*d* of the case 8 by means of a fixing member (not shown) such as a bolt or the like.

In the case of the second tethers 30B, one end of each thereof is connected to the vehicle body's outer surface side (lower panel 12) of a mid portion of each of the inflated pillar masking portions 5*b* in its up-and-down direction. In this embodiment, the one end of each of the second tethers 30B is sewn to the lower panel 12 by a sewn portion (not shown) that is not common to the sewn portion (for example, circumferential sewn portion 13, circular sewn portion 21, or the like) for sewing the upper panel 11 and lower panel 12 together, which constitute the outer surface of each of the pillar masking portions 5*b*.

It is noted that the position where the one end of each of the second tethers 30B is joined to the lower panel 12 by being sewn is located in the inner side of the lower panel 12 relative to the utmost periphery of a portion of the lower panel 12, the portion constituting each of the pillar masking portions 5*b* (the midpoint side of the pillar masking portion 5*b* in its extending direction and also in its widthwise direction).

The other ends of the second tethers 30B are fixed to the left and right end walls 8*d*, the left and right end sides of a front wall portion 8*b*, or corner portions of the case 8, respectively, by means of a fixing member (not shown) such as a bolt or the like, each of the corner portions being a place where the left or right end wall 8*d* and the front wall portion 8*b* intersect each other. However, the position for connecting each of the second tethers 30B to the case 8 is not limited to these.

Furthermore, in this embodiment, there are provided linking members 40 for linking each of the pillar masking portions 5*b* to the cowl masking portion 5*a* in corner portions where these portions intersect each other.

As shown, in this embodiment, each of the linking members 40 is a triangular sheet-like member, adjacent two edges of which are connected to the pillar masking portion 5*b* and the cowl masking portion 5*a*, respectively. It is noted that each of the linking members 40 may be constructed to be a continuous one body with the upper panel 11 and/or lower panel 12, which constitute the outer surface of the airbag 5, or may be constructed separately from the upper panel 11 and lower panel 12 and be sewn thereto. In this case, the linking member 40 may be sewn by the circumferential sewn portion 13 sewing the panels 11, 12 together or the like, or by a sewing portion not common thereto.

The shape of the linking members 40 is not limited to this, but may be a suspension rope-like member strung between the pillar masking portion 5*b* and the cowl masking portion 5*a*, or a tube-like member or small bag-like member, both ends of which are connected to the pillar masking portion 5*b* and the cowl masking portion 5*a*, respectively.

The other configuration of the pedestrian airbag apparatus 4A is the same as the pedestrian airbag apparatus 4 shown above in FIGS. 1 to 10, and identical elements in FIG. 12 with those shown in FIGS. 1 to 10 are indicated by identical reference characters. And, the activation of the pedestrian airbag apparatus 4A is also similar to that of the pedestrian airbag apparatus 4 of FIGS. 1 to 10.

In this pedestrian airbag apparatus 4A, the both left and right end sides of the cowl masking portion 5*a* of the airbag 5A are connected to the case 8 by means of the first tethers 30A, respectively, the cowl masking portion 5*a* when inflated extending leftward and rightward so as to spread out from the case, while the pillar masking portions 5*b* connected to the both left and right sides of the cowl masking portion 5*a* are connected to the case by means of the second tethers 30B, respectively. When the airbag 5A is inflated, therefore, the fluttering of not only the both left and right end sides of the cowl masking portion 5*a* but also the respective pillar masking portions 5*b* is suppressed.

It should be noted that, in this embodiment, each of the second tethers 30B is connected to the outer surface of the pillar masking portion 5*b* at a position on the inner side relative to the utmost periphery thereof (the midpoint side of the pillar masking portion 5*b* in its extending direction and also in its widthwise direction). Accordingly, when the airbag 5A is inflated to extend, it hardly occurs that the utmost periphery of each of the pillar masking portions 5*b* (namely, the side end face of each of the pillar masking portions 5*b* in its inflated state) is pulled to the undersurface side of the airbag due to the tension of the second tether 30B, and a moment that serves so as to wind the end side of the pillar masking portion 5*b* toward the undersurface side of the airbag hardly arises on the utmost periphery of the pillar masking portion 5*b*. Because of this, the occurrence of a deformation such as warpage, buckling, twisting, or the like on each of the pillar masking portions 5*b* is also suppressed.

Furthermore, in this embodiment, since there are provided the linking members 40 for linking the respective pillar masking portions 5*b* and the cowl masking portions 5*a* in corner portions where these portions intersect each other, when the airbag 5A is inflated, the fluttering of the respective pillar masking portions 5*b* is further suppressed.

It is noted that each of the pillar masking portions 5*b*, although being connected to the case 8 by the one second tether 30B in the embodiment described above, may be connected to the case 8 by two or more tethers.

In the embodiment described above, in addition to the both end sides of the cowl masking portion 5*a*, each of the pillar masking portions 5*b* is connected to the case by means of a tether, but any portion other than described above may be connected to the case 8 by means of a tether.

Figure 13:
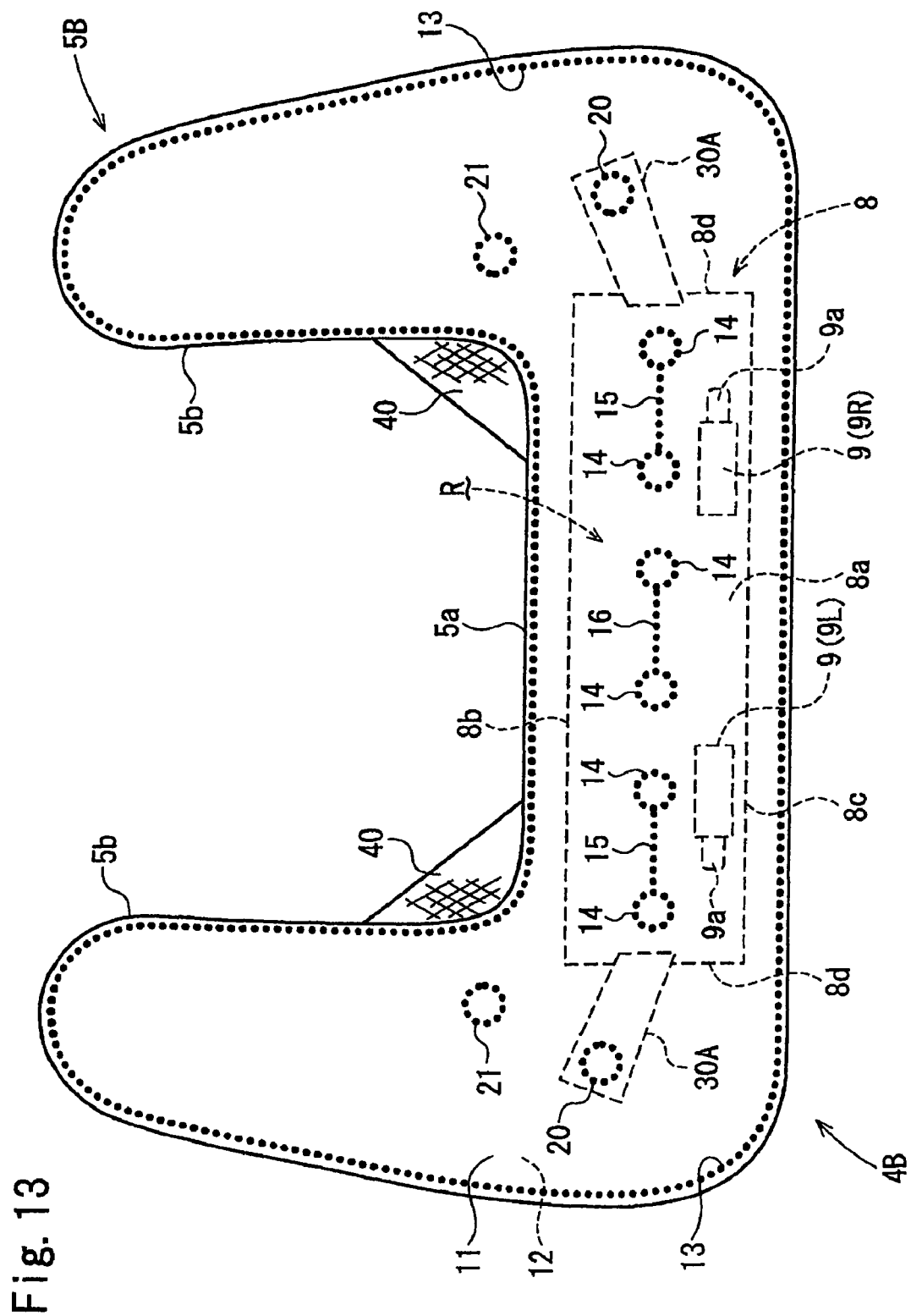
FIG. 13 is a plan view of a pedestrian airbag apparatus, when its airbag is inflated, according to another embodiment of the present invention.

It is also noted that although the pedestrian airbag apparatus is configured such that, in the embodiment described above, the linking member 40 for linking each of the pillar masking portions 5*b* to the cowl masking portion 5*a* in a corner portion where these portions intersect each other is provided in addition to the second tether 30B connecting each of the pillar masking portions 5*b* to the cowl masking portion 5*a*, a pedestrian airbag apparatus of the present invention may be configured such that only any one of these members is provided to the pillar masking portion. FIG. 13 is a plan view of a pedestrian airbag apparatus in a state when its airbag is inflated, showing an example of a configuration in which only the linking member 40 is provided to the pillar masking portion, and FIG. 14 is a plan view of a pedestrian airbag apparatus in a state when its airbag is inflated, showing an example of a configuration in which only the second tether 30B is provided to the pillar masking portion.

Specifically, the airbag 5B of the pedestrian airbag apparatus 4B of FIG. 13 has a configuration such that the second tethers 30B connecting the pillar masking portions 5*b* to the case 8 are omitted from the airbag 5A of FIG. 12 described above (that is, a configuration such that only the linking members 40 for linking the pillar masking portions 5*b* to the cowl masking portion 5*a* are provided to the pillar masking portions 5*b*, respectively). In this embodiment, only the tethers 30 (corresponding to the first tethers 30A in the embodiment of FIG. 12) connecting the both left and right end sides of the cowl masking portion 5a to the case 8 are each provided as the tether.

Figure 14:
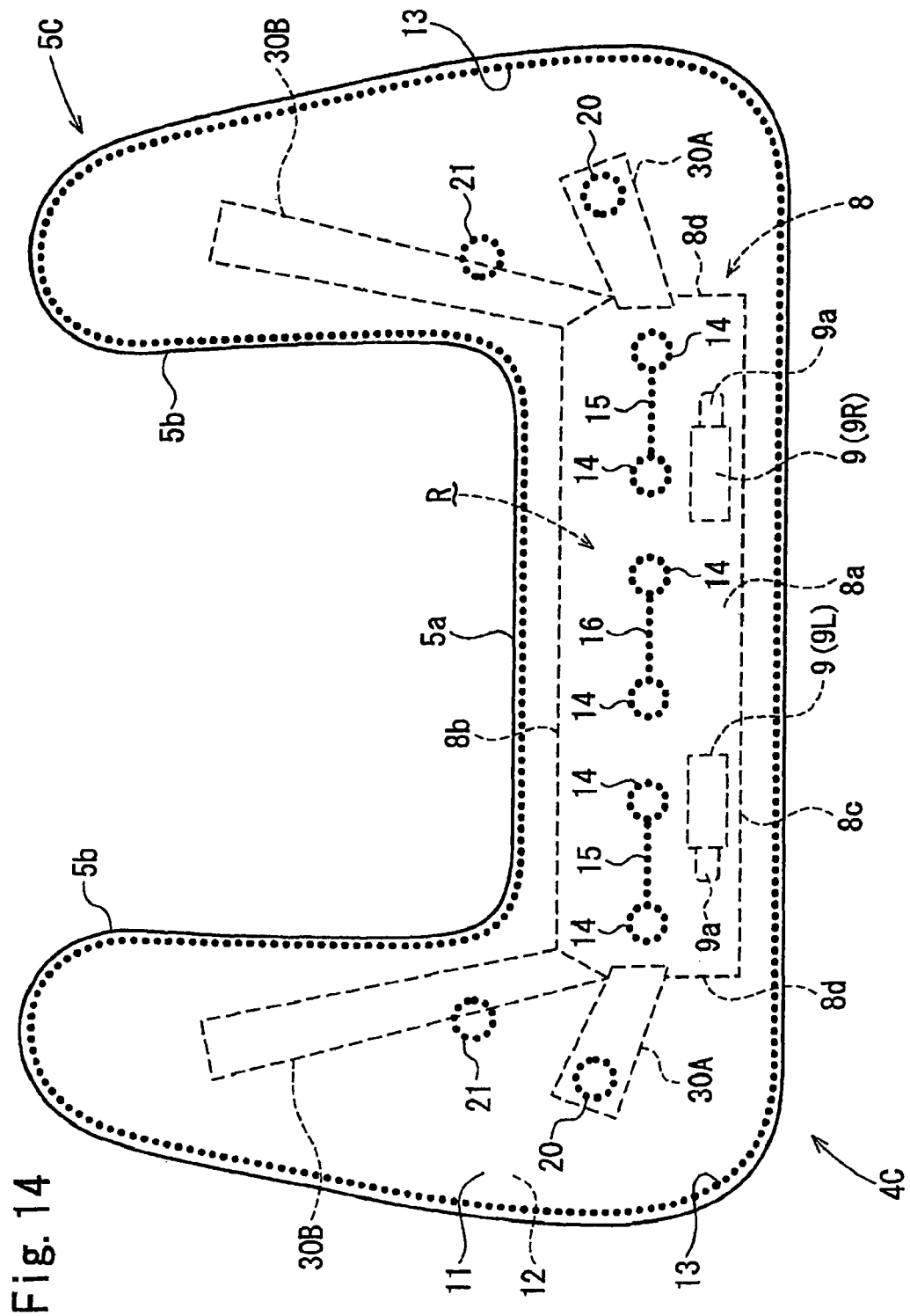
FIG. 14 is a plan view of a pedestrian airbag apparatus, when its airbag is inflated, according to another embodiment of the present invention.

Contrarily to this, the airbag 5C of the pedestrian airbag apparatus 4C of FIG. 14 has a configuration such that the linking members 40 for linking the pillar masking portions 5b to the cowl masking portion 5a are omitted from the airbag 5A of FIG. 12 described above (that is, a configuration such that only the second tethers 30B connecting the pillar masking portions 5b to the case 8 are provided to the pillar masking portions 5b, respectively).

The other configuration of the embodiments of FIGS. 13 and 14 is the same as the embodiment of FIG. 12, and identical elements in FIGS. 13 and 14 with those shown in FIG. 12 are indicated by identical reference characters.

Even in the case that only the linking members 40 or the second tethers 30B are provided to the pillar masking portions 5b as with the embodiments of FIGS. 13 and 14, when the airbag 5B or 5C is inflated, the fluttering of the respective pillar masking portions 5b can be suppressed.

It should be noted that this patent application is based on the patent application in Japan applied on Jan. 17, 2006 (Japanese Patent Application No. 2006-8862) and the patent application in Japan applied on Mar. 20, 2006 (Japanese Patent Application No. 2006-77016), and is assisted by reference to the whole thereof.

The invention claimed is:

1. A pedestrian airbag apparatus comprising:
an airbag adapted to be inflated and to extend along a vehicle body's outer surface, the airbag having an upper panel and a lower panel;
a plurality of localized connections between the upper and lower panels;
a case accommodating the airbag;
a tether disposed below the airbag; and
an inflator for inflating the airbag, which, when inflated, extends out from the case along the vehicle body's outer surface so as to spread into surroundings of the case, and a portion of which is connected to the case through the tether, the portion spreading into the surroundings of the case in its inflated state,
wherein, in a state when the airbag is inflated, an outboard end of the tether is connected to the airbag at a position corresponding to one of the local connections between the upper and lower panels which is located outboard of the case, the tether extending in a direction of an outboard spreading of the airbag away from the case, and an inboard end of the tether is connected to the case.

2. The pedestrian airbag apparatus according to claim 1, wherein, in a state when the airbag is inflated, the lower panel is located adjacent an outer surface of the vehicle body, and the plurality of localized connections between the upper panel and the lower panel of the airbag each comprise a sewn portion, and the outboard end of the tether is joined to the lower panel by one of the sewn portions.

3. The pedestrian airbag apparatus according to claim 2, wherein at least one of the sewn portions has a circular shape.

4. The pedestrian airbag apparatus according to claim 1, wherein the air bag comprises:
a cowl masking portion extending along a rear edge of a bonnet hood of a vehicle body in its widthwise direction; and
a pillar masking portion, a lower end of which is connected to the cowl masking portion, extending along an A-pillar of the vehicle body substantially in its up-and-down direction,
wherein a linking member for linking the cowl masking portion and the pillar masking portion is provided in a corner portion outside the air bag where these portions intersect each other.

5. The pedestrian airbag apparatus according to claim 4, wherein the cowl masking portion has a width extending from a left side to a right side of a vehicle body.

6. The pedestrian airbag apparatus according to claim 1, wherein the case has an end, to which the inboard end of the tether is connected.

7. The pedestrian airbag apparatus according to claim 1, wherein said tether further comprises another tether longer than the tether and having an inboard end connected to the case and an outboard end connected to the lower panel of the airbag at a location distal from the position at which the tether is connected.

8. The pedestrian airbag apparatus according to claim 7, wherein the air bag comprises:
a cowl masking portion extending along a rear edge of a bonnet hood of a vehicle body in its widthwise direction; and
a pillar masking portion, a lower end of which is connected to the cowl masking portion, extending along an A-pillar of the vehicle body substantially in its up-and-down direction, and
wherein the outboard end of the another tether is connected to the lower panel at a location located at least within mid point of the pillar masking portion.

9. A pedestrian airbag apparatus comprising:
an airbag adapted to inflate and extend along a vehicle body's outer surface, and having:
a cowl masking portion extending along a rear edge of a bonnet hood of a vehicle body in its widthwise direction; and
a pillar masking portion, a lower end of which is connected to the cowl masking portion, extending along an A-pillar of the vehicle body substantially in its up-and-down direction,
a case accommodating the airbag;
an inflator for inflating the airbag and causing the airbag to spread out from the case into a surrounding of the case, and
a first tether and a second tether; wherein when the cowl masking portion and the pillar masking portion are inflated, an outboard end of the first tether is connected to the cowl masking portion at a position laterally outboard of the case, an inboard end of the first tether is connected to the case, an upper end of the second tether is connected to a mid portion of the pillar masking portion in its up-and-down direction, and a lower end of the second tether is connected to the case.

10. The pedestrian airbag apparatus according to claim 9, wherein a linking member for linking the cowl masking portion and the pillar masking portion is provided in a corner portion outside the air bag where these portions intersect each other.

11. The pedestrian airbag apparatus according to claim 9, wherein the cowl masking portion has a width extending from a left side to a right side of a vehicle body.

* * * * *